United States Patent [19]
Matsuzuki

[11] Patent Number: 5,497,225
[45] Date of Patent: Mar. 5, 1996

[54] COLOR IMAGE FORMING APPARATUS HAVING A PLURALITY OF DRUMS FOR A PLURALITY OF COLORS

[75] Inventor: Masato Matsuzuki, Kawasaki, Japan

[73] Assignee: Fujitsu Limited, Kawasaki, Japan

[21] Appl. No.: 297,100

[22] Filed: Aug. 29, 1994

[30] Foreign Application Priority Data

Nov. 19, 1993 [JP] Japan ................... 5-314333

[51] Int. Cl.$^6$ .................................................. G03G 15/01
[52] U.S. Cl. ........................... 355/326 R; 355/327
[58] Field of Search ......................... 355/200, 210, 355/211, 212, 326 R, 327; 347/116, 154

[56] References Cited

U.S. PATENT DOCUMENTS

| | | | |
|---|---|---|---|
| 4,531,828 | 7/1985 | Hoshino | 355/327 X |
| 4,690,542 | 9/1987 | Furuta et al. | 355/327 |
| 4,752,804 | 6/1988 | Ohno | 355/327 |
| 4,796,050 | 1/1989 | Furuta et al. | 355/327 X |
| 5,243,396 | 9/1993 | Castelli et al. | 355/327 |
| 5,287,160 | 2/1994 | Dastin et al. | 355/326 R |

FOREIGN PATENT DOCUMENTS 3-149576  6/1991  Japan.
3-293679  12/1991  Japan.

Primary Examiner—William J. Royer
Attorney, Agent, or Firm—Armstrong, Westerman, Hattori, McLeland & Naughton

[57] ABSTRACT

A color image forming apparatus for forming a color image on a sheet by use of a plurality of photosensitive drums. The plurality of photosensitive drums correspond to a plurality of colors and have eccentric phases each shifted by a quantity corresponding to a radius of the photosensitive drum and a distance between transfer positions of the photosensitive drums. The color image forming apparatus also includes a plurality of charging units which correspond to the respective photosensitive drums, for charging the photosensitive drums. An exposure light source effects an image exposure on each photosensitive drum. A plurality of developing units correspond to the respective photosensitive drums, for forming toner images on the photosensitive drums by developing electrostatic latent images on the photosensitive drums. A plurality of transferring units, corresponding to the respective photosensitive drums, transfer the toner images on the photosensitive drums onto the sheet. The eccentric phases of the plurality of photosensitive drums are set the same on the basis of the sheet to be fed, and a color deviation of each color on the sheet can be thereby prevented.

28 Claims, 12 Drawing Sheets

$F1 + F2 + F3 + F4 = 0$

COLOR IMAGE FORMING APPARATUS HAVING A PLURALITY OF DRUMS FOR A PLURALITY OF COLORS

BACKGROUND OF THE INVENTION

1. Field of the Invention

The present invention relates generally to a color image forming apparatus for forming toner images assuming a plurality of colors and, more particularly, to a color image forming apparatus provided with photosensitive drums for the plurality of colors, respectively.

2. Description of the Related Art

In an image forming apparatus such as a copying machine, a printer, a facsimile, etc., an electrophotographic apparatus has been utilized due to a demand for recording on ordinary paper. In such an image forming apparatus, an electrostatic latent image is formed on a photosensitive drum and thereafter developed, thereby forming a toner image. Then, the toner image on the photosensitive drum is, after being transferred onto a sheet, fixed onto the sheet by heating.

In response to a demand for forming color images in recent years, color image forming apparatuses for forming toner images assuming the plurality of colors have been offered. A color image forming apparatus has been proposed which is mounted with the photosensitive drums corresponding to the plurality of colors. According to this method, the images in respective colors can be formed in series, and, therefore, the color images can be formed at a high speed. However, the toners in respective colors on the photosensitive drums are transferred, resulting in an easy-to-occur color deviation on the sheet. A countermeasure against the color deviation has been sought.

FIG. 11 is a view illustrating a construction of a conventional color image forming apparatus. As depicted in FIG. 11, there are disposed in series four photosensitive drums 90-1 through 90-4 corresponding to four colors (M, Y, C, K) respectively as basic colors for color images. An image exposing unit 91 exposes the images in the respective color components on the photosensitive drums 90-1 to 90-4.

The sheet is fed from left to right as seen in the Figure by an electrostatic adsorption belt 93. Accordingly, a first-color toner image on the photosensitive drum 90-1 is transferred onto the sheet by a transferring unit 92-1. Next, a second-color toner image on the photosensitive drum 90-2 is transferred by a transferring unit 92-2. Subsequently, a third-color toner image is transferred by a transferring unit 92-3. Finally, a fourth-color toner image on the photosensitive drum 90-4 is transferred by a transferring unit 92-4.

This type of color image forming apparatus is disclosed in Japanese Patent Laid-Open Publication Nos. 3-149576 and 3-293679. The major problem inherent in this type of color image forming apparatus is, it is pointed out, the color deviation. This color deviation is classified in terms of its causes into (1) a color deviation which occurs at a stage of forming the latent image on the photosensitive drum, and (2) a color deviation which is produced at a stage of transferring the toner image onto the sheet. The former is the color deviation which occurs even in such a case that the sheet is accurately fed, but the latter is the color deviation produced due to an inaccurately fed sheet. According to the known techniques given above, there is disclosed a construction to correct the color deviations derived from expansions and contractions of the units due to fluctuations in temperature as well as from errors in mounting the units.

An eccentricity may be given as a factor of the color deviation peculiar to the apparatus including the four drums. This is the color deviation attributed to differences in eccentric quantity and in eccentric phase between the four photosensitive drums. For this reason, the eccentricity in the exposure position causes a color deviation of the latent image. Further, the eccentricity in the transfer position is a factor in producing an error in the feeding of the sheet.

A mechanism for producing color deviation when exposed due to the eccentricity of the photosensitive drum will be explained with reference to FIGS. 12A and 12B. As illustrated in FIG. 12B, the image exposing unit 91 irradiates a polygon mirror 911 with beams of light from a laser light source 910 via a collimator lens 913, thus effecting a light scan through the polygon mirror 911. Then, the scanning light falls on the photosensitive drum 90 via an f-θ lens 912. At this time, if the photosensitive drum 90 has an eccentricity $\epsilon$, a position of the image surface changes in the direction of an optical-axis. This results in a variation in dot position in a main scan direction. At this time, a variation quantity ΔP1 is given by the following formula (1):

$$\Delta P1 = \epsilon \times \tan \theta 1 \qquad (1)$$

For example, when $\epsilon=0.15$ mm and $\theta 1=20$ degrees, the dot positional deviation quantity ΔP1 at both edge portions of printing is 54.6 μm. This deviation quantity corresponds to a level great enough to recognize it as a color deviation through human eyes. Hence, this deviation quantity is unacceptable in a color printer targeted on a high image quality.

Further, as illustrated in FIG. 12A, the beam of light has an inclination θ2 with respect to a subscan direction. This is intended to prevent the beam of light reflected by the photosensitive drum 90 from traveling back to the laser light source 910. This inclination θ2 also induces the dot positional deviation ΔP2 in the subscan direction. The variation quantity ΔP2 at this time is given by the following formula (2):

$$\Delta P2 = \epsilon \times \tan \theta 2 \qquad (2)$$

Hence, as illustrated in FIG. 13A, it can be appreciated that the eccentricities of the photosensitive drums cause the positional deviations of the latent image both in the main scan direction and in the subscan direction when exposed. In the case of the apparatus including the four drums, since there are scatters in the eccentric quantities and the eccentric phases of the respective photosensitive drums, this color deviation when exposed appears directly as a color deviation on the sheet.

An explanation of the mechanism of producing the color deviation when transferred by transfer unit 92 due to the eccentricities of the photosensitive drums will now be explained. As shown in FIG. 13B, if there exists an eccentricity $\epsilon$ of the photosensitive drum, and even when the photosensitive drum is rotating at a constant speed ω, a peripheral speed v of the photosensitive drum in the transfer position is expressed by the following formula (3):

$$v = v0 + \epsilon \omega \times \sin \omega t \qquad (3)$$

Accordingly, the peripheral speed v of the photosensitive drum fluctuates depending on the eccentric quantity $\epsilon$ of the photosensitive drum. In this case, when the sheet and the endless sheet feeding unit, such as an electrostatic absorption belt or the like, are brought into contact in the transfer position of the photosensitive drum, a force is produced corresponding to the fluctuation in the peripheral speed, which force acts either in a feeding direction or in the reverse direction. It therefore follows that a motion of the electrostatic adsorption belt or the sheet may be disturbed. As a result, color deviation appears on the sheet.

SUMMARY OF THE INVENTION

It is a primary object of the present invention to provide a color image forming apparatus constructed to reduce a color deviation on a sheet, which is derived from eccentricities of photosensitive drums.

It is another object of the present invention to provide a color image forming apparatus constructed to reduce the color deviation when in an image exposure process, which deviation is caused by the eccentricities of the photosensitive drums.

It is still another object of the present invention to provide a color image forming apparatus constructed to reduce the color deviation when in a transfer process, which deviation is caused by the eccentricities of the photosensitive drums.

To accomplish the objects given above, according to the present invention, there is provided a color image forming apparatus for forming multi-color images on a sheet. The color image forming apparatus comprises a plurality of photosensitive drums provided corresponding to a plurality of colors and having eccentric phases each shifted by a quantity corresponding to a radius of the photosensitive drum and a distance between transfer positions of the photosensitive drums; a plurality of charging units, provided corresponding to the respective photosensitive drums, for charging said photosensitive drums; an exposing source for effecting an image exposure on each photosensitive drum; a plurality of developing units, provided corresponding to the respective photosensitive drums, for forming toner images on the photosensitive drums by developing electrostatic latent images on the photosensitive drums; and a plurality of transferring units, provided corresponding to the respective photosensitive drums, for transferring the toner images on the photosensitive drums onto the sheet.

According to the present invention, the eccentric phases of the respective photosensitive drums on the sheet are adjusted, thereby reducing a color deviation when in the exposure process, which is caused by eccentricities of the photosensitive drums. A dot positional deviation with respect to the latent image on each photosensitive drum is produced by the eccentricity. According to the present invention, however, this positional deviation is corrected between the respective photosensitive drums, thereby reducing the relative positional deviation (color deviation) of dots in each color. For this purpose, the eccentric phase of each photosensitive drum is set based on a sheet feed distance L between the transferring units and on a radius R of the photosensitive drum. With this setting, the respective photosensitive drums work to effect transfer processing in the same eccentric phase onto the sheet to be fed. It is therefore feasible to reduce the color deviation due to the eccentricities of the respective photosensitive drums.

Other features and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principle of the invention, in which.

DETAILED DESCRIPTION OF THE PREFERRED EMBODIMENTS

Figure 1:
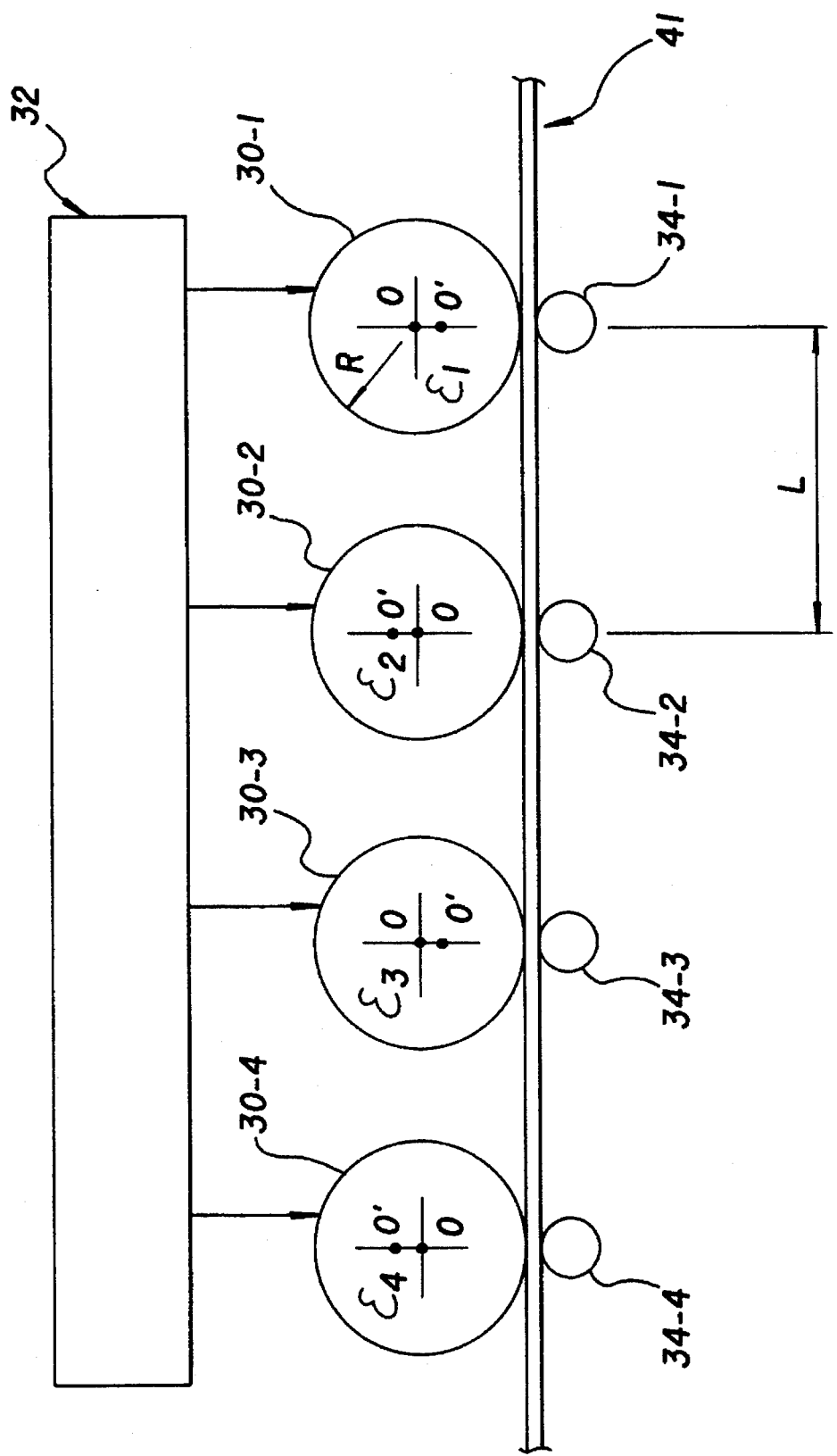
FIG. 1 is a diagram showing a principle of the present invention.

FIG. 1 is a diagram illustrating a principle of the present invention.

As depicted in FIG. 1, four units of photosensitive drums 30-1 through 30-4 are arranged in series. These four photosensitive drums 30-1 to 30-4 are eccentric. Eccentric phases $\Phi$ of these photosensitive drums 30-1 to 30-4 are set at 180 degrees with respect to each other. Further, a distance L in transfer position between the respective photosensitive drums 30-1 to 30-4 is set such as $L=R\cdot\Phi$ (where R is the radius of each of the photosensitive drums 30-1 to 30-4).

With this arrangement, the eccentric phases of the respective photosensitive drums on a sheet can be adjusted. Thus, it is possible to reduce a color deviation caused due to an eccentricity of the photosensitive drum. That is, a latent image on each photosensitive drum entails a dot positional deviation due to the eccentricity. According to the present invention, however, this positional deviation is corrected between the respective photosensitive drums relatively from the sheet to be fed. With this processing, the relative dot positional deviation (color deviation) in each color is reduced.

Thus, each of the photosensitive drums effects a transferring process in the same eccentric phase on the sheet to be fed. Accordingly, it is feasible to reduce the color deviation due to the eccentricity of each photosensitive drum on the sheet.

Figure 2:
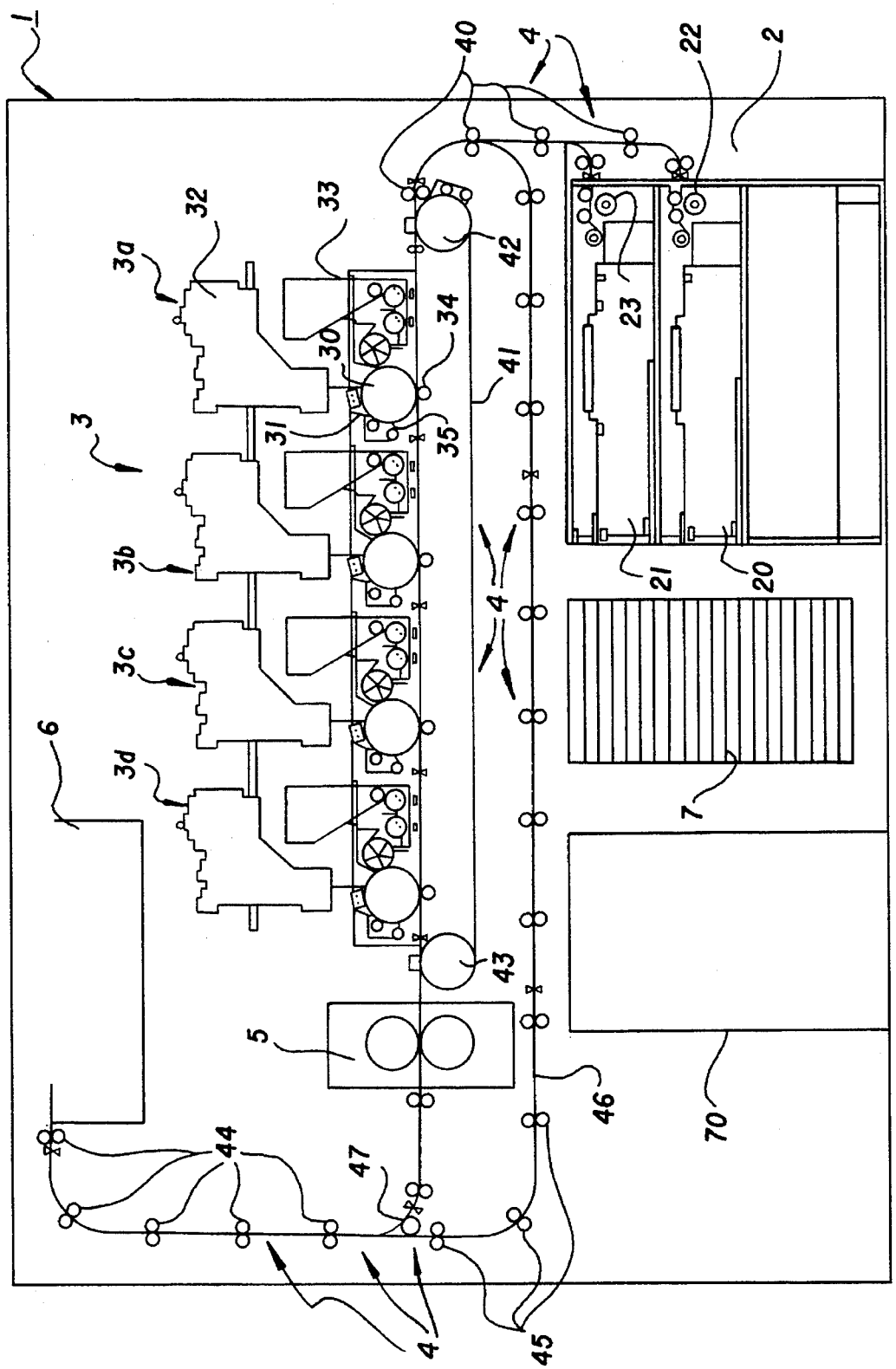
FIG. 2 is a view illustrating a construction of a color printer in a preferred exemplary embodiment of the present invention.
Figure 3:
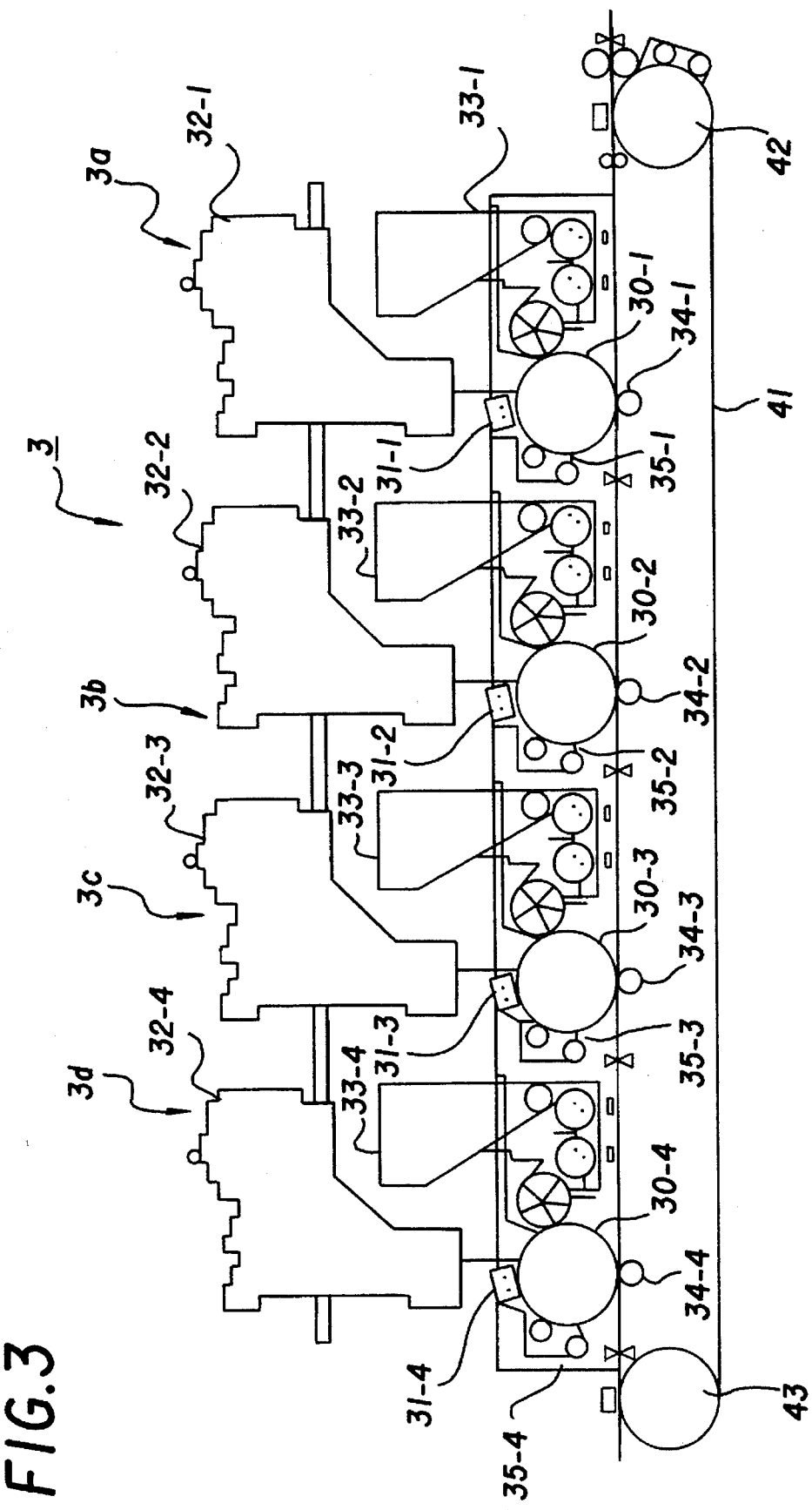
FIG. 3 is an enlarged view of an image forming unit of FIG. 2.

FIG. 2 is a view illustrating a construction of a color image forming apparatus in a preferred exemplary embodiment of the present invention. FIG. 3 is an enlarged view of an image forming unit of FIG. 2. In this embodiment, a color electrophotographic printer will be exemplified as a color image forming apparatus.

As depicted in FIG. 2, a color electrophotographic printer 1 comprises a hopper 2 for housing sheets, an image forming unit 3 for forming toner images on the surface of the sheet and a sheet feeding system 4. The printer 1 also comprises a fixing unit 5 for fixing the toner images onto the sheet, a stacker 6 for accommodating the discharged sheets, a control circuit 7 and a power supply 70.

The hopper 2 has sheet cassettes 20, 21 provided at two stages. These sheet cassettes 20, 21 are detachably attached from the front surface of the apparatus. Provided are pickup units 22, 23 for taking the sheets out of the sheet cassettes 22, 23 and separating the sheets.

The image forming unit 3 includes electrophotographic mechanisms 3a, 3b, 3c, 3d for respectively forming the toner images in full colors, i.e., Magenta, yellow, cyan and black.

As illustrated in FIGS. 2 and 3, each of the electrophotographic mechanisms 3a, 3b, 3c, 3d has its components marked with the reference numerals 30-35. As shown in FIG. 3, each of the photosensitive drums 30-1 to 30-4 is constructed such that a photoconductive layer is formed along the periphery of a metal drum and rotates clockwise. Respective pre-chargers 31-1 to 31-4 uniformly charge the photosensitive drums 30-1 to 30-4. Laser optical systems (image exposing units) 32-1 to 32-4 expose photo-images on the respective photosensitive drums 30-1 to 30-4, thereby forming electrostatic latent images on the photosensitive drums 30-1 to 30-4. Developing units 33-1 to 33-4 supply developers to the photosensitive drums 30-1 to 30-4, and the electrostatic latent images are developed with the developers, thus forming the toner images. Transferring rollers 34-1 to 34-4 transfer the toner images on the photosensitive drums 30-1 to 30-4 onto the sheet to be fed. De-electrifiers/cleaners 35-1 to 35-4 remove residual electric charges out of the photosensitive drums 30-1 to 30-4 and thereafter clean off the residual toners.

Note that the respective developing units 33-1 to 33-4 of the electrophotographic mechanisms 3a, 3b, 3c, 3d house the developers in magenta, yellow, cyan and black and supply these developers to the photosensitive drums 30-1 to 30-4.

Referring to FIG. 2, the sheet feeding system 4 is equipped with feed rollers 40 for feeding the sheet from the sheet cassettes 20, 21 to an inlet of the image forming unit 3. The sheet feeding system 4 is also equipped with a belt feeding mechanism (41, 42, 43) for feeding the sheet from the inlet to an outlet of the image forming unit 3. This belt feeding mechanism is constructed in such a way that an electrostatic adsorption belt 41 is stretched between a pair of rollers 42, 43. The sheet is fed from the inlet to the outlet of the image forming unit 3 by the electrostatic adsorption belt 41 moved by those rollers 42, 43. Using this electrostatic adsorption belt 41 makes it possible to minimize a positional deviation of the sheet in a transfer position of each of the electrophotographic mechanisms 3a, 3b, 3c, 3d.

The sheet feeding system 4 is further equipped with discharge rollers 44, disposed posterior to the fixing unit 5, for feeding the sheet from the fixing unit 5 to the stacker 6. Provided further is a mechanism for performing double-side printing. More specifically, an inversion path 46 for feeding the sheet is formed posterior to the fixing unit 5 but extending to the inlet of the image forming unit 3. This inversion path 46 is equipped with a multiplicity of feeding rollers 45. Further, an inversion impeller 47 is provided posterior to the fixing unit 5.

The following is an explanation of the operation of the printer of the preferred exemplary embodiment. The sheets are let out of each of the sheet cassettes 20, 21 by the pickup units 22, 23 and thereafter fed to the inlet of the image forming unit 3. These sheets are sequentially fed to the electrophotographic mechanisms 3a, 3b, 3c, 3d by the belt feed mechanism (41, 42, 43). Meanwhile, the color toner images on the photosensitive drums 30-1 to 30-4 of the electrophotographic mechanisms 3a, 3b, 3c, 3d are transferred onto one surface of the sheet by the transferring rollers 34-1 to 34-4. Then, the sheet is fed to the fixing unit 5, wherein the toner images are thermally fixed. The sheet undergoing the fixing process is fed toward the stacker 6 by the discharge rollers 44.

The following is a way of performing double-side printing. When the trailing edge of the sheet reaches the impeller 47, the feed of the sheet is stopped. Then, the impeller 47 is rotated counterclockwise, thereby directing the trailing edge of the sheet toward the inversion path 46. Subsequently, the discharge rollers 44 are reversely rotated, and the feed rollers 46 are rotated, with the result that the sheet is fed along the inversion path 46 toward the inlet of the image forming unit 3.

The sheets reaching the inlet of the image forming unit 3 are, as in the same way with the foregoing single-side printing, sequentially fed to the electrophotographic mechanisms 3a, 3b, 3c, 3d by the belt feed mechanism (41, 42, 43). In the meantime, the color toner images on the photosensitive drums 30-1 to 30-4 of the electrophotographic mechanisms 3a, 3b, 3c, 3d are transferred onto the opposite surface of the sheet by the transferring rollers 34-1 to 34-4. Then, the sheet is fed to the fixing unit 5, wherein the toner images are thermally fixed. The sheet undergoing the fixing process is discharged into the stacker 6 by the discharge rollers 44. Double-sided printing is thus carried out.

As a matter of course, single-side printing entails, after the printing has been effected on one surface of the sheet, discharging the sheet into the stacker 6 with the discharge rollers 44.

Based on the construction discussed above, the inversion path for the double-side printing is formed between the hopper 2 and the image forming unit 3, and, therefore, the double-side color printing apparatus can be constructed to attain its down-sizing. Further, since a feed path 4 extending from the hopper 2 to the stacker 6 is formed in an S-shape, the color printing apparatus can bs constructed small in size. Moreover, the electrostatic adsorption belt is employed, and hence it is possible to form the color images with a less amount of color deviation in each color.

Figure 4:
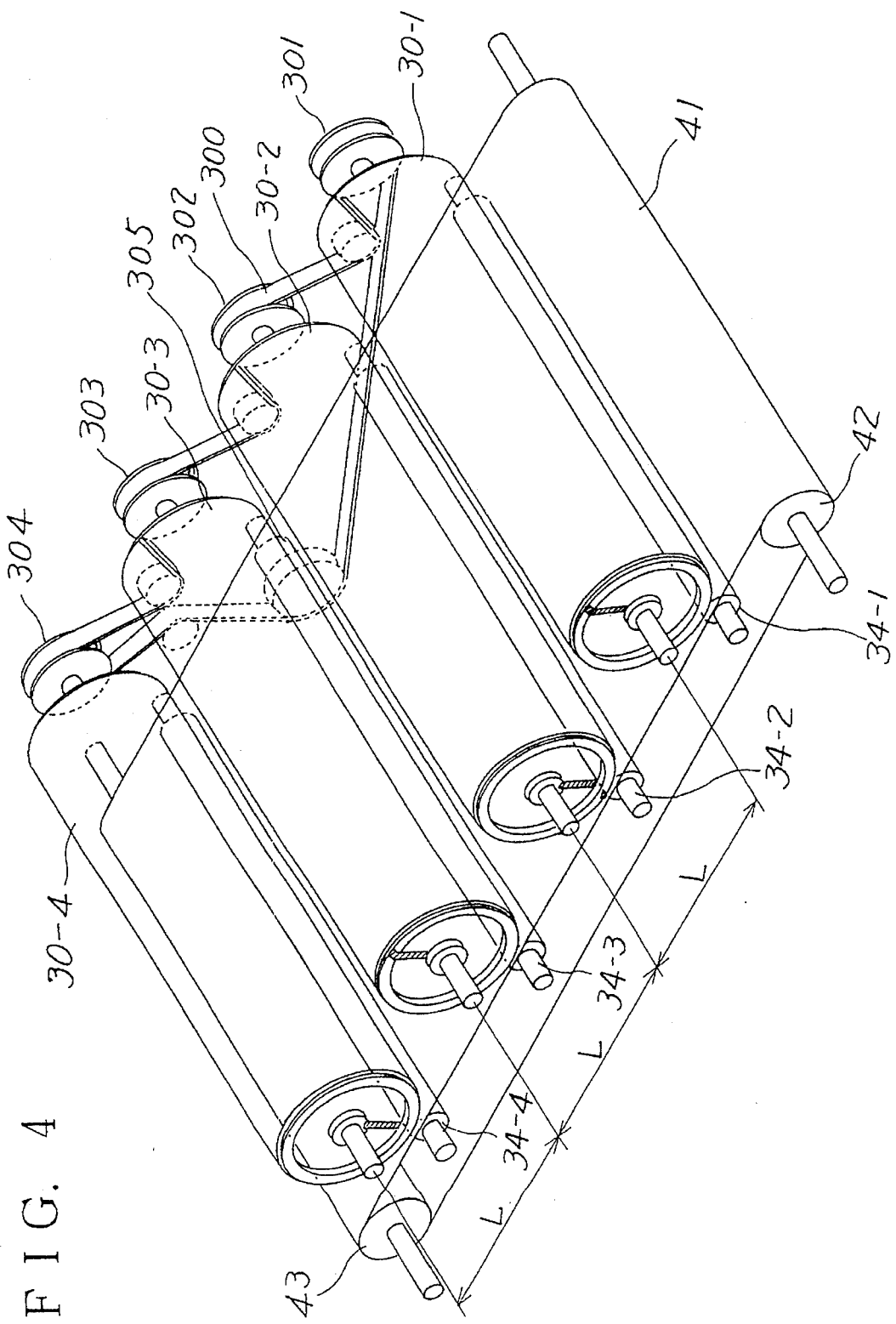
FIG. 4 is a perspective view of a group of photosensitive drums of FIG. 3.
Figure 5:
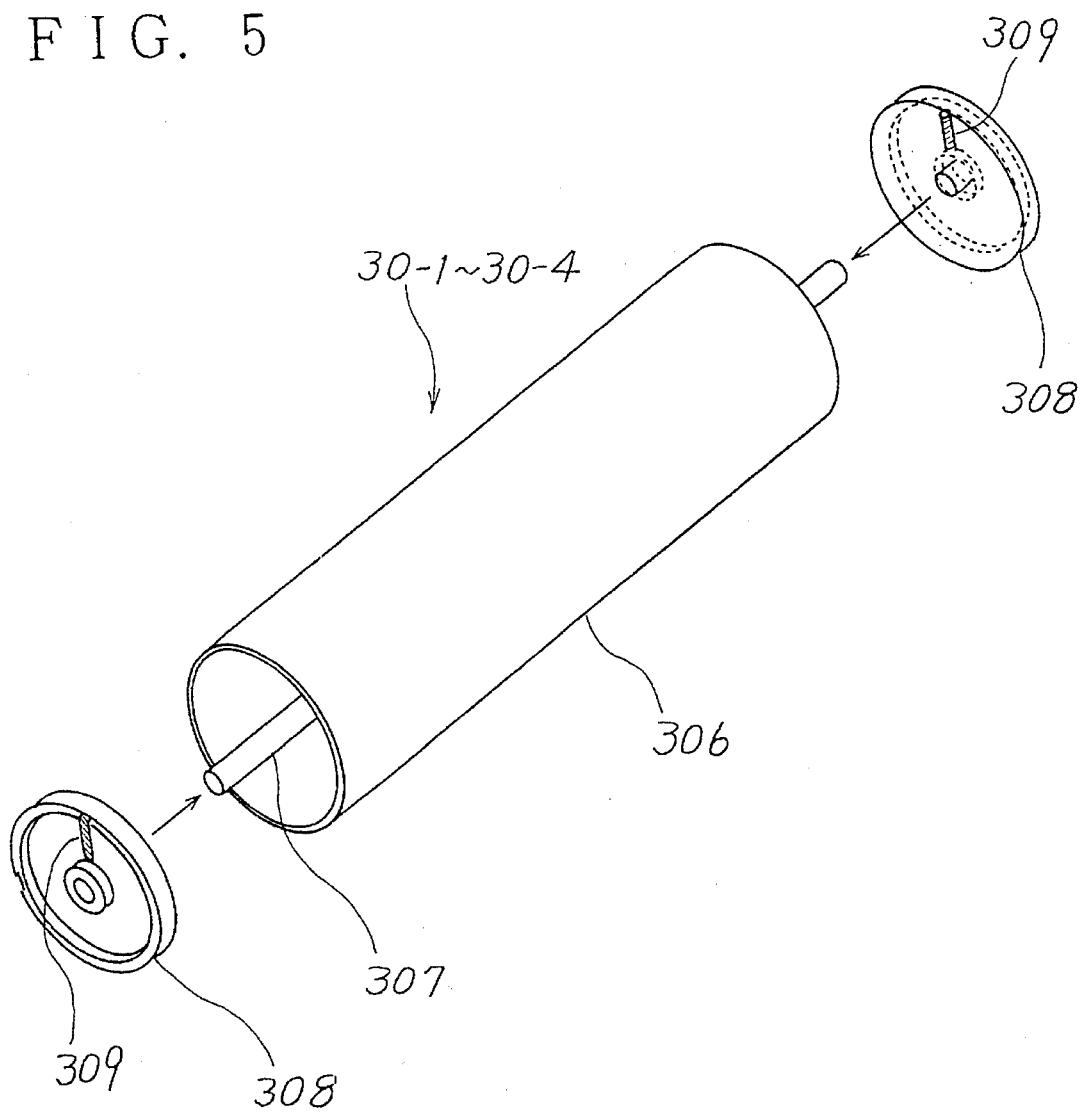
FIG. 5 is a view illustrating a configuration of the photosensitive drum of FIG. 4.
Figure 6:
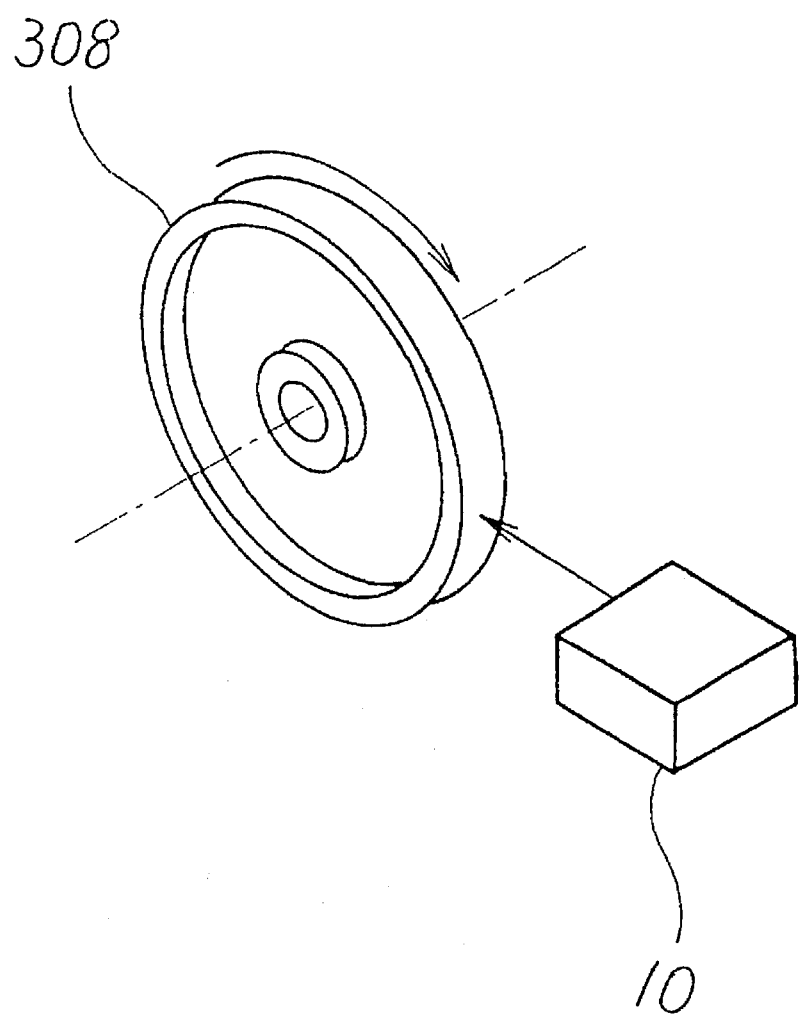
FIG. 6 is an explanatory view explaining a measurement of an eccentric phase of the photosensitive drum of FIG. 5.
Figure 7A:
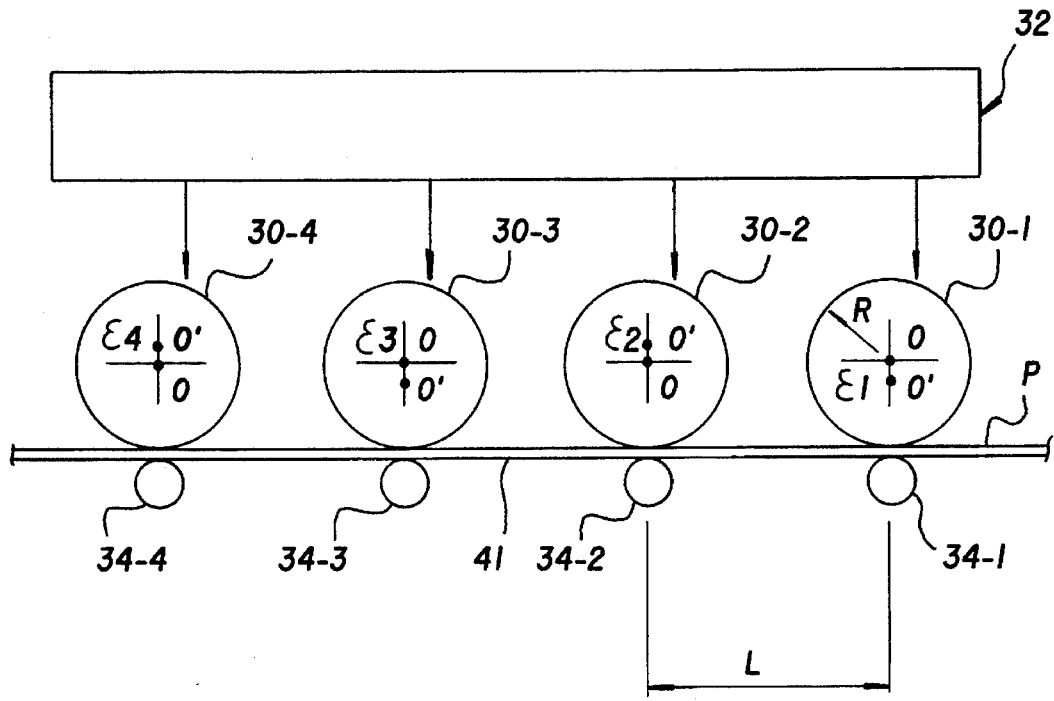
FIGS. 7A and 7B are explanatory views explaining the operation of a preferred exemplary embodiment of the present invention.
Figure 7B:
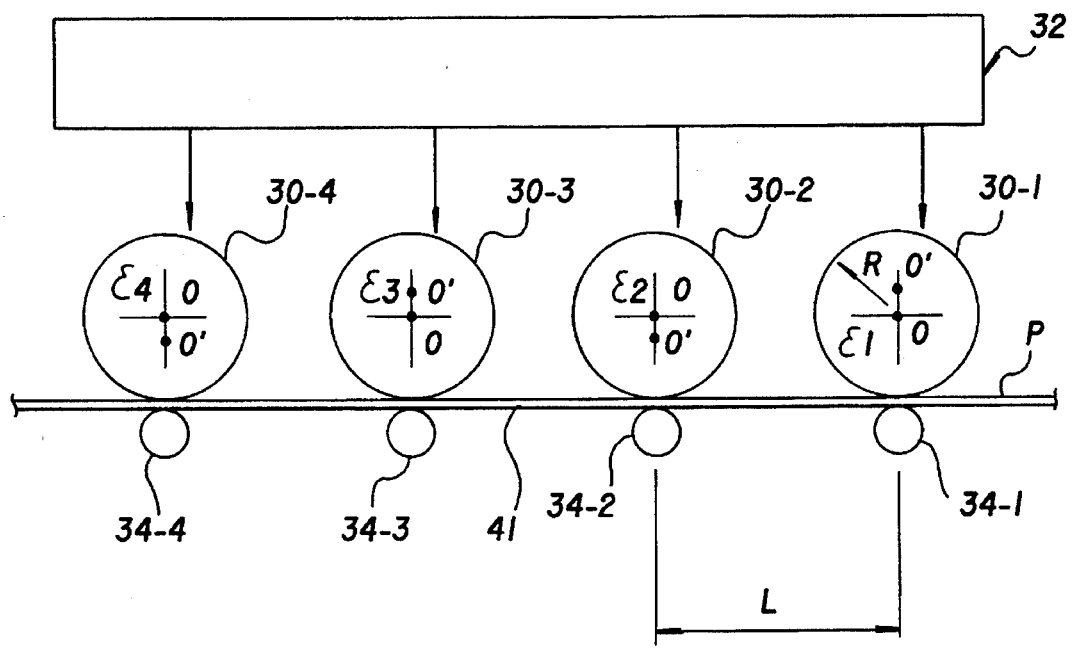
Figure 8A:
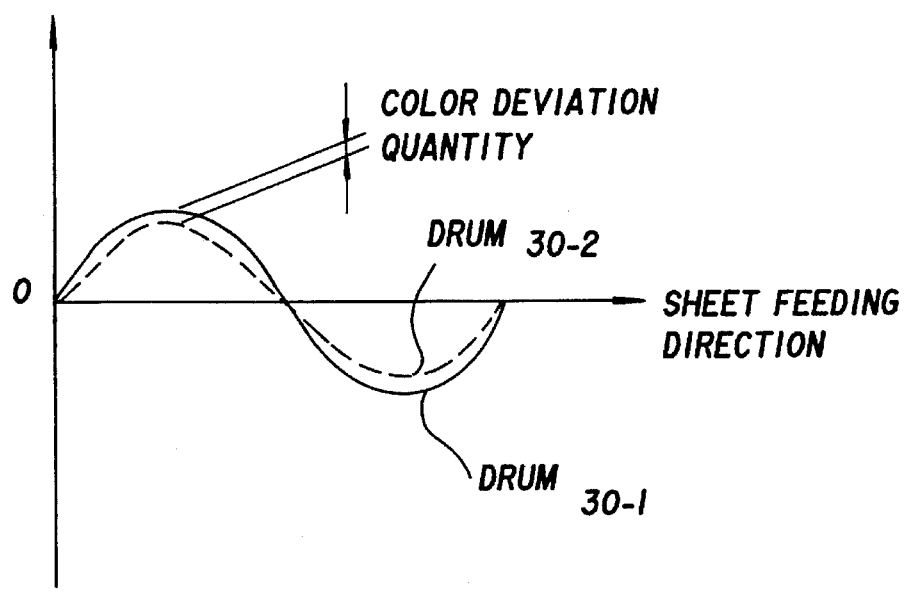
FIGS. 8A and 8B are graphs showing the performance of the preferred exemplary embodiment of the present invention.
Figure 8B:
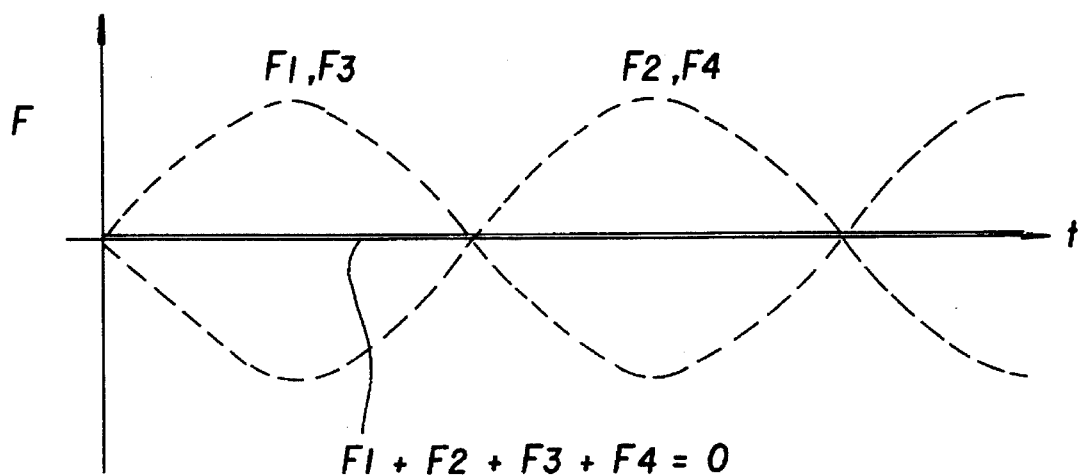

FIG. 4 is a perspective view of the photosensitive drum. FIG. 5 is a view illustrating a configuration of the photosensitive drums. FIG. 6 is an explanatory view when measuring an eccentric phase of a flange. FIGS. 7A and 7B are explanatory views explaining the operation thereof. FIGS. 8A and 8B are graphs illustrating the performance of the embodiment.

As illustrated in FIG. 4, the four photosensitive drums 30-1 to 30-4 are arranged in series at an equal interval L. The electrostatic adsorption belt 41 is stretched between the rollers 42 and 43 under those photosensitive drums 30-1 to 30-4. Further, the transferring rollers 34-1 to 34-4 are arranged along the electrostatic adsorption belt 41 under the photosensitive drums 30-1 to 30-4.

Pulleys 301–304 are attached to shafts of those four photosensitive drums 30-1 to 30-4. A synchronous belt 300 is wound on a drum drive shaft 305 and extended along these pulleys 301–304. Accordingly, rotations of the drum drive shaft 305 are transferred via the synchronous belt 300 to the respective pulleys 301–304, whereby the photosensitive drums 30-1 to 30-4 are rotated in synchronism.

The photosensitive drums 30-1 to 30-4 are, as will be mentioned later, are so arranged that the eccentric phases thereof are shifted with a predetermined rule in order to adjust the eccentricities of the photosensitive drums 30-1 to 30-4 on the sheet.

To start with, there will be explained a method of adjusting the eccentricities of the photosensitive drums 30-1 to 30-4. As depicted in FIG. 5, each of the photosensitive drums 30-1 to 30-4 is assembled by press-fitting flanges 308 into two side-portions of a shaft 307 of a drum base tube 306. More specifically, the photosensitive drum is assembled by fitting major-diameter portions of the flanges 308 into minor-diameter portions of the drum base tube 306. Such a construction being taken, the eccentricity of each of the photosensitive drums 30-1 to 30-4 is derived mainly from the fact that the major and minor diameters of the flanges 308 are eccentric.

For this reason, the eccentricity of the flange 308 is measured. As illustrated in FIG. 6, the flange 308 is rotated, and an eccentric quantity is measured by a known eccentric quantity measuring unit 10. At this time, an eccentric mark 309 (see FIG. 5) is written in such an angular position as to measure the eccentric quantity of the flange 308 as a maximum quantity. The eccentric mark 309 is written by marking or an oil marker, etc. After writing this eccentric mark 309, as illustrated in FIG. 5, each of the photosensitive drums 30-1 to 30-4 is assembled. At this time, the flanges 308 are attached so that positions of the eccentric marks 309 of the flanges 308 on both sides are positioned the same with respect to the single drum base tube 306. It follows that the thus assembled photosensitive drums 30-1 to 30-4 are eccentric in the directions of the eccentric marks 309. That is, each of the photosensitive drums 30-1 to 30-4 has an eccentric phase, with the eccentric mark 309 being fiducial.

Next, as illustrated in FIG. 4, the photosensitive drums 30-1 to 30-4 are mounted on the apparatus, and a drive timing belt 300 is wound. The photosensitive drums 30-1 to 30-4 are set so that the eccentric mark 309 of each of the photosensitive drum 30-1 to 30-4 has a predetermined angle. This adjustment can be attained with an accuracy of a tooth pitch of the timing belt 300.

Herein, the predetermined angle is expressed by the following formula:

$$\Phi = L/R \text{ (rad)} \qquad (3)$$

where $\Phi$ is the angle (eccentric phase) of the eccentric mark which is to shift between the adjacent photosensitive drums, L is the pitch between the photosensitive drums, and R is the radius of the photosensitive drum.

Accordingly, each of the photosensitive drums 30-1 to 30-4 has an eccentric phase which is shifted by the eccentric phase angle $\Phi$ from each other.

FIG. 4 shows a case where $\Phi=180$ degrees. At this time, for instance, when R=40 mm, the configuration may be taken so that L=125.7 mm. Namely, according to the formula (3), the distance L may be set so that L=$\pi$R, wherein the distance L is a half of the peripheral length of each of the photosensitive drums 30-1 to 30-4.

This operation will be explained with reference to FIGS. 7A and 7B. Paying attention to the photosensitive drums 30-1 and 30-2, the adjacent photosensitive drums 30-1, 30-2 have eccentric marks, the positions of which deviate by 180 degrees from each other (the eccentric phase is shifted 180 degrees). Then, the distance L between the photosensitive drums 30-1 and 30-2 is determined in the foregoing manner from the radii of the photosensitive drums 30-1, 30-2 as well as from the positions of eccentric marks 309. Therefore, in connection to the sheet P, the respective photosensitive drums 30-1, 30-2 work to transfer the toner images onto the sheet P in the same eccentric phase.

That is, as depicted in FIG. 7A, when the leading edge of the sheet P exists in a position 0-0' of the eccentric mark 309 of the photosensitive drum 30-1, the sheet P is subjected to the transferring process from the position of the eccentric mark 309 of the photosensitive drum 30-1. As illustrated in FIG. 7B, after this transferring process has been done, and when the leading edge of the sheet P reaches a position of the next photosensitive drum 30-2, the position 0-0' of the eccentric mark 309 of the photosensitive drum 30-2 is at the leading edge of the sheet P. Hence, the transferring process is effected on the sheet P from the position of the eccentric mark 309 of the photosensitive drum 30-2.

Accordingly, as shown in FIG. 8A, the eccentric phases of the photosensitive drums 30-1, 30-2 are equal to each other as viewed from the sheet P. From the foregoing, it is possible to reduce a color deviation quantity (dot positional deviation quantity) on the sheet which is caused by the eccentricity itself. However, eccentric quantities $\epsilon1$, $\epsilon2$ of the photosensitive drums 30-1, 30-2 are not necessarily the same, and, hence, a color deviation quantity corresponding thereto remains. Note that the operations of the photosensitive drums 30-3, 30-4 are the same.

As discussed above, when the eccentric phase of each of the photosensitive drums 30-1 to 30-4 is shifted 180 degrees, a total sum of fluctuations in terms of the peripheral speeds of the photosensitive drums 30-1 to 30-4 at the same timings in the transferring positions of the photosensitive drums 30-1 to 30-4 becomes substantially zero. More specifically, in a state shown in FIG. 7A, the first and third photosensitive drums 30-1, 30-3 contact the belt 41 in such a position that the eccentric quantity is maximized, while the second and fourth photosensitive drums 30-2, 30-4 contact the belt 41 in such a position that the eccentric quantity is minimized. Supposing that each of the photosensitive drums 30-1 to 30-4 rotates at a constant angular speed, the peripheral speed thereof is maximized in the position where the eccentric quantity is maximized but minimized in the position where the eccentric quantity is minimized.

On the other hand, a peripheral speed of the belt 41 is set in terms of design in accordance with an average value of the peripheral speeds of the photosensitive drums 30-1 to 30-4. Therefore, the peripheral speed of each of the first and third photosensitive drums 30-1, 30-3 is higher than the peripheral speed of the belt 41. On the other hand, the peripheral speed of each of the second and fourth photosensitive drums is lower than the peripheral speed of the belt 41.

Accordingly, as illustrated in FIG. 8B, in connection with directions of frictional forces acting between the belt 41 and the respective drums, frictional forces F1, F3 by the first and third photosensitive drums 30-1, 30-3 assume antiphases with respect to frictional forces F2, F4 by the second and fourth photosensitive drums 30-2, 30-4. The frictional forces (disturbance forces on the belt) offset each other, and, therefore, the traveling of the belt 41 can be kept constant. Thus, the color deviation due to fluctuations in traveling speed of the belt can be prevented.

That is, as illustrated in FIG. 8B, the eccentric phases of the photosensitive drums 30-1, 30-3 and the eccentric phases of the photosensitive drums 30-2, 30-4 are shifted 180 degrees. Accordingly, the disturbance forces relative thereto and exerted on the belt 41, because of deviating by 180 degrees, are therefore offset from each other by the photosensitive drums 30-1 to 30-4.

In this manner, the eccentric phases of the photosensitive drums 30-1 to 30-4 are shifted corresponding to the distance between the transfer positions of the photosensitive drums as well as to the radii of the photosensitive drums. It is therefore possible to reduce the color deviation occurring when exposed through the photosensitive drums 30-1 to 30-4. Further, the eccentric phases of n-pieces of photosensitive drums are shifted by angles of integral multiples of $2\pi/n$ (where $2\pi/4 \times 2 = \pi$), and thus, the color deviation caused when transferred can also be reduced.

Further, the eccentric phases of the photosensitive drums 30-1 to 30-4 are shifted 180 degrees, thereby making it feasible to reduce both the color deviation when exposed and the color deviation when transferred.

Figure 9:
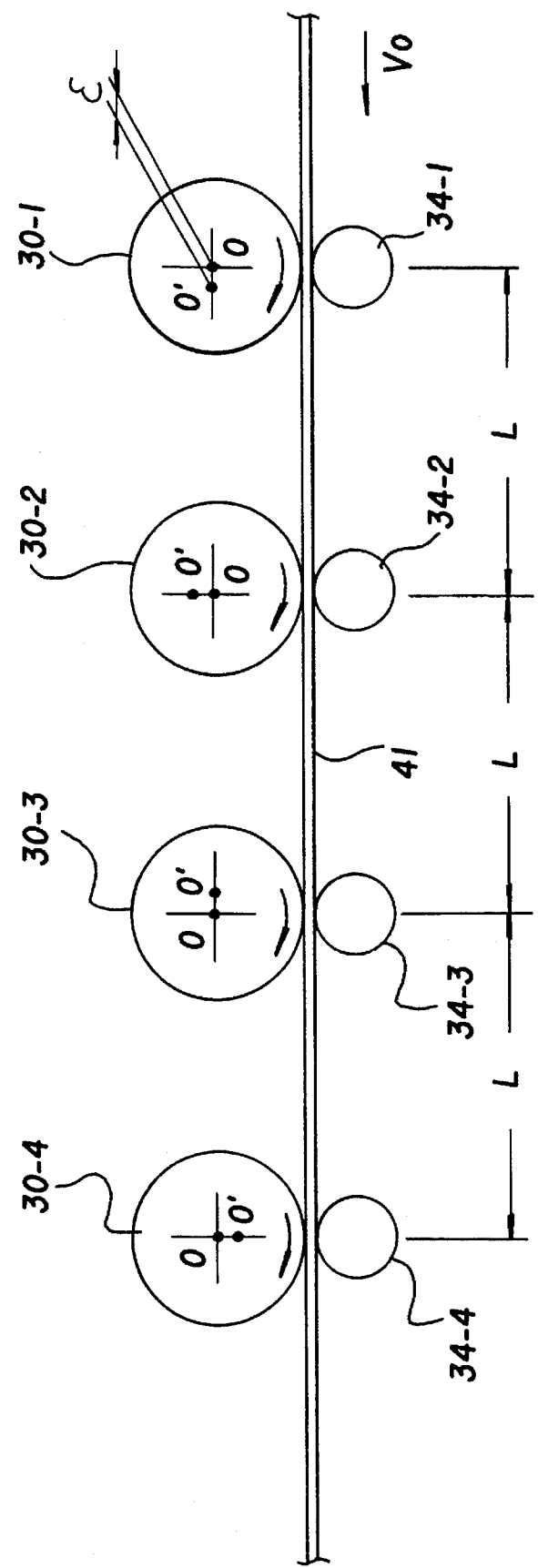
FIG. 9 is a view illustrating a construction of another embodiment of the present invention.
Figure 10:
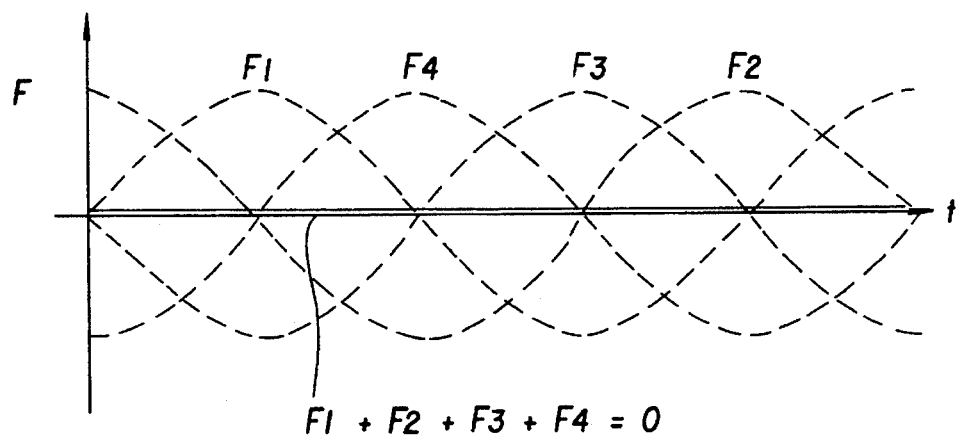
FIG. 10 is an explanatory view of another embodiment of FIG. 9.
Figure 11:
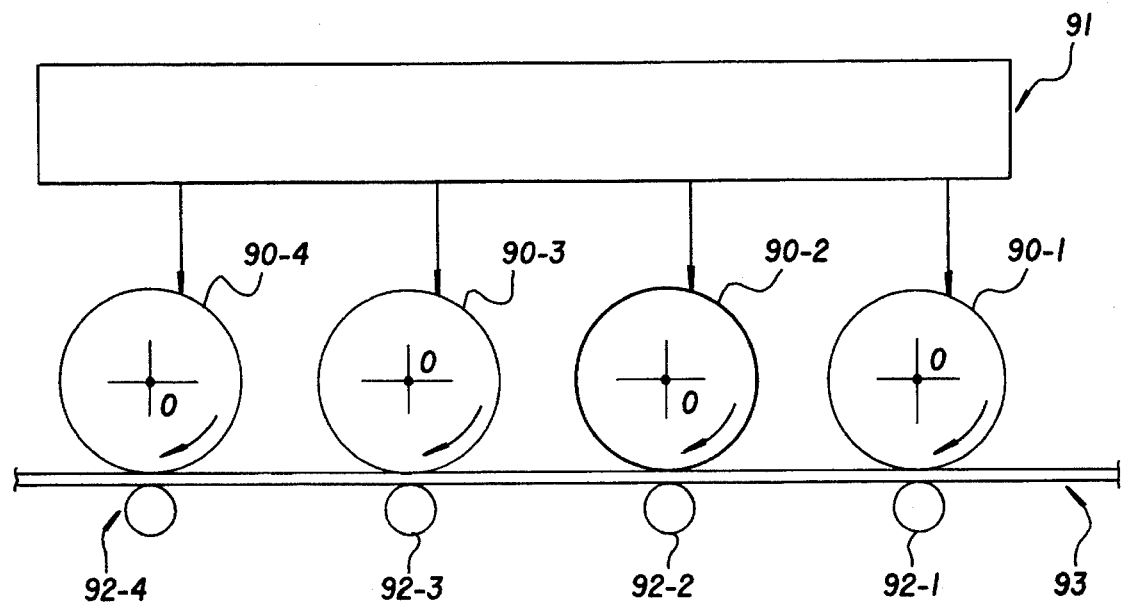
FIG. 11 is a view illustrating a construction of a conventional color image forming apparatus.
Figure 12A:
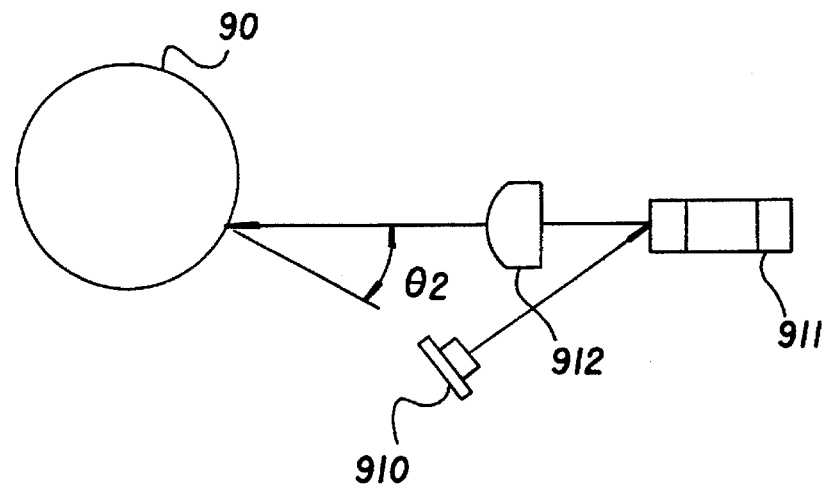
FIGS. 12A and 12B are explanatory views explaining an exposure deviation in the conventional apparatus.
Figure 12B:
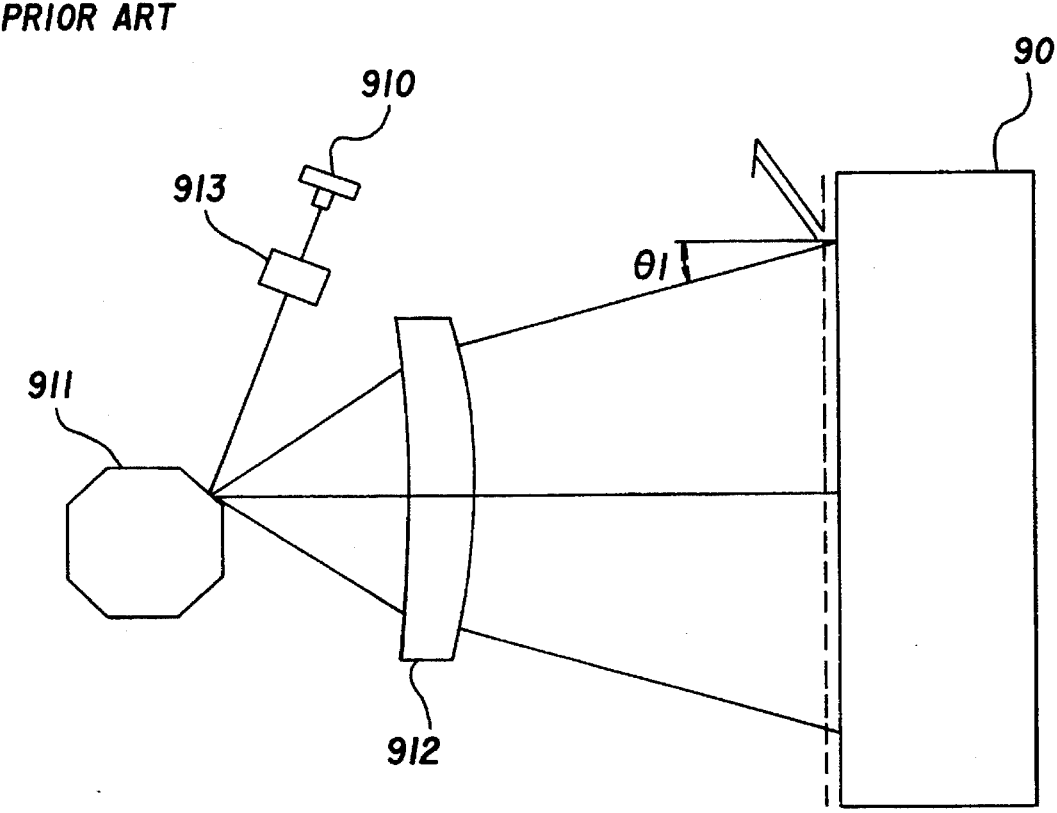
Figure 13A:
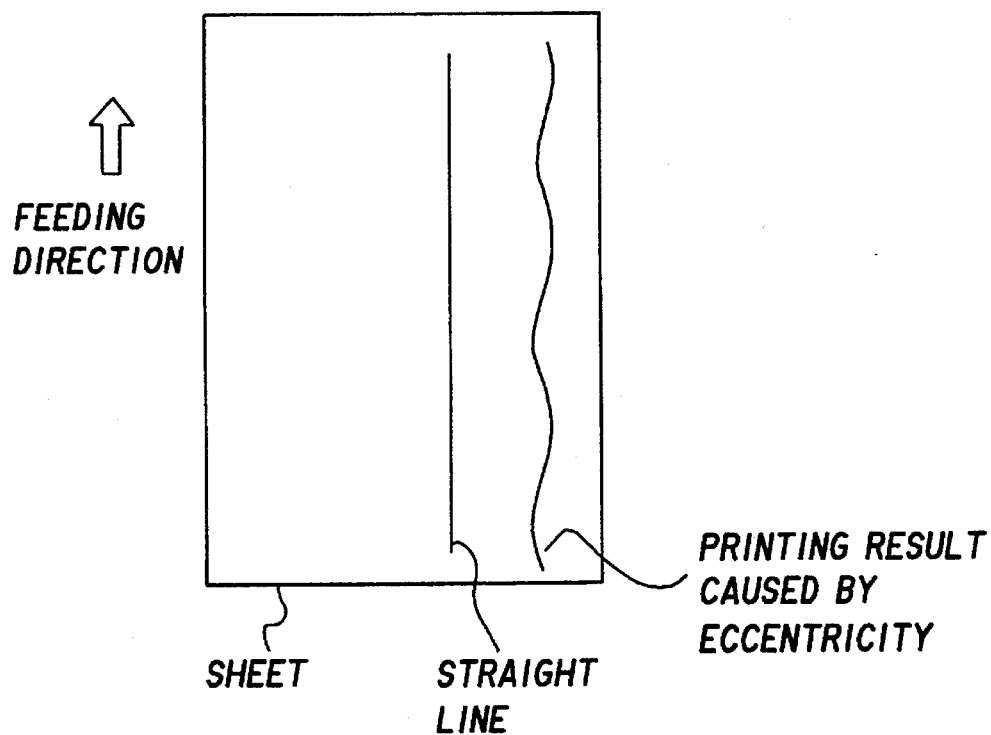
FIG. 13A is a diagram showing a result of printing based on the prior art.
Figure 13B:
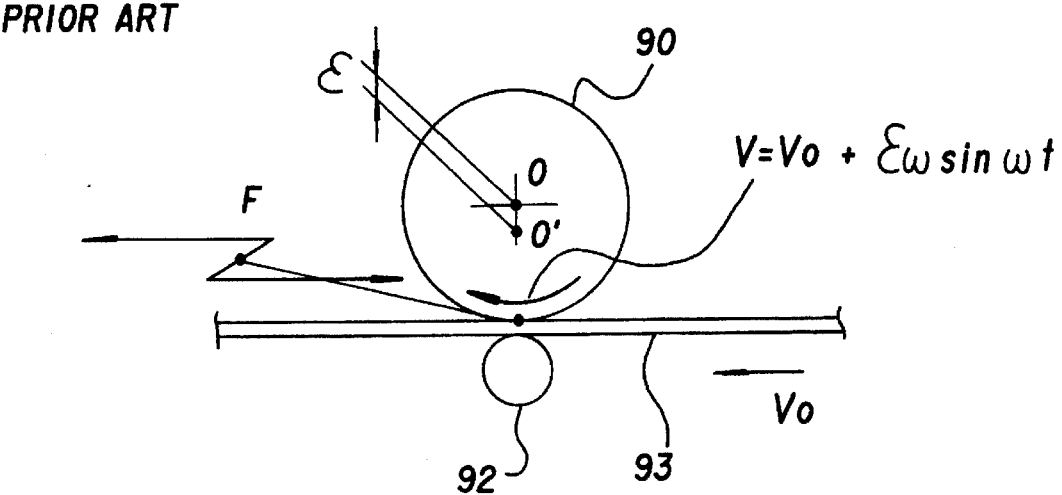
FIG. 13B is an explanatory view explaining a fluctuation in speed according to the prior art.

FIG. 9 is a view illustrating a construction of another embodiment of the present invention. FIG. 10 is an explanatory view showing still another embodiment of the present invention.

As depicted in FIG. 9, in accordance with this embodiment, the position 0-0' of the eccentric mark 309 of each of the photosensitive drums 30-1 to 30-4 deviates by 90 degrees. That is, the eccentric phase between the adjacent photosensitive drums is shifted 90 degrees. In this case, each distance L between the photosensitive drums 30-1 through 30-4 is, from the above relational expression such as $\Phi = L/R$, set to ¼ as small as the peripheral length of each of the photosensitive drums 30-1 to 30-4. With this setting, in regard to the sheet P, the photosensitive drums 30-1 to 30-4 work to transfer the toner images onto the sheet P in the same eccentric phase.

Namely, as illustrated in FIG. 7A, when the leading edge of the sheet P exists in the position 0-0' of the eccentric mark 309 of the photosensitive drum 30-1, the sheet P is subjected to the transferring process from the position of the eccentric mark 309 of the photosensitive drum 30-1. After this transferring process has been thus carried out, and when the leading edge of the sheet P reaches a position of the next photosensitive drum 30-2, the position 0-0' of the eccentric mark 309 of the photosensitive drum 30-2 is at the leading edge of the sheet P. Hence, the transferring process is performed on the sheet P from the position of the eccentric mark 309 of the photosensitive drum 30-2.

Accordingly, as shown in FIG. 8A, the eccentric phases of the photosensitive drums 30-1, 30-2 are equal to each other as viewed from the sheet P. From the foregoing, it is possible to reduce the color deviation quantity (dot positional deviation quantity) on the sheet which is caused by the eccentricity itself. However, the eccentric quantities $\epsilon 1$, $\epsilon 2$ of the photosensitive drums 30-1, 30-2 are not necessarily the same, and, hence, the color deviation quantity corresponding thereto remains. Note that the operations of the photosensitive drums 30-3, 30-4 are the same.

Similarly, in the state of FIG. 9, the peripheral speed of the photosensitive drum 30-1 in the transfer position is given by $V0 + \epsilon \omega \cdot \sin \omega t$. Likewise, the peripheral speed of the photosensitive drum 30-2 at the same timing is given by $V0 + \epsilon \omega \cdot \sin(\omega t + \pi/2)$. The peripheral speed of the photosensitive drum 30-3 in the transfer position is expressed such as $V0 + \epsilon \omega \cdot \sin(\epsilon t + \pi)$. The peripheral speed of the photosensitive drum 30-4 in the transfer position is given by $V0 + \epsilon \omega \cdot \sin(\omega t + 3\pi/2)$.

Accordingly, the frictional force acting between the belt 41 and each drum is, with respect to the first photosensitive drum 30-1, expressed such as $f \epsilon \omega \cdot \sin \omega t$, where f is the rotating force of each of the photosensitive drums 30-1 to 30-4. The frictional force pertaining to the second photosensitive drum 30-2 is given by $f \epsilon \omega \cdot \sin(\omega t + \pi/2)$. The frictional force relative to the third photosensitive drum 30-3 is given by $f \epsilon \omega \cdot \sin(\omega t + \pi)$. The frictional force pertaining to the fourth photosensitive drum 30-4 is expressed such as $f \epsilon \omega \cdot \sin(\omega t + 3\pi/2)$.

As illustrated in FIG. 10, a resultant-of-forces (F1+F2+F3+F4) thereof acts on the belt 41, and, consequently, the frictional forces (disturbance forces on the belt) offset each other. For this reason, the traveling of the belt 41 can be kept constant. Thus, it is possible to prevent the color deviation due to the fluctuations in terms of the traveling speed of the belt 41. That is, as shown in FIG. 10, the eccentric phases of the photosensitive drums 30-1 to 30-4 are shifted 90 degrees with respect to each other. Hence, the disturbance forces thereof also deviate by 90 degree, with the result that the disturbance forces acting on the belt 41 are thereby offset.

In this way, the eccentric phases of the photosensitive drums 30-1 to 30-4 are shifted 90 degrees ($2\pi/4 = \pi/2$), whereby the color deviations when exposed and transferred can be reduced.

In addition to the embodiments discussed above, the following modifications of the present invention can be carried out. First, although the explanation has been given wherein the eccentric phases of the respective photosensitive drums are shifted 180 degrees and 90 degrees, the eccentric phases may be shifted at angles other than the foregoing and properly selected corresponding to the number of the photosensitive drums to be provided. Second, in the embodiments discussed above, the transferring rollers have been exemplified by way of the transferring unit, but it may involve the use of a transferring/charging unit. Third, the image forming apparatus has been explained in the form of the printer but may be other image forming apparatuses such as a copying machine, a facsimile, etc. Fourth, the image exposing unit has been described in the form of the laser scanning system but may involve the use of other exposing mechanisms such as an LED array, a liquid crystal shutter mechanism, etc.

The present invention has been discussed so far by way of the embodiments but may be effected in a variety of modifications within the range of the gist of this invention. These modifications are not eliminated from the scope of the present invention.

As explained above, according to the present invention, the eccentric phases of the plurality of photosensitive drums are shifted with the fixed rule and thereby adjusted on the sheet, resulting in the reduction of the color deviation. Further, the eccentric phases of the photosensitive drums are simply shifted, and the apparatus can be therefore readily actualized at relatively low costs.

What is claimed is:

1. A color image forming apparatus for forming a multicolor image on a sheet, comprising:

a plurality of photosensitive drums provided corresponding to a plurality of colors and having eccentric phases each shifted by a quantity corresponding to a radius of each of said photosensitive drums and a distance between transfer positions of said photosensitive drums;

a plurality of charging units, provided corresponding to said photosensitive drums, for charging said photosensitive drums;

an exposing source for effecting an image exposure on said photosensitive drums;

a plurality of developing units, provided corresponding to said photosensitive drums, for forming toner images on said photosensitive drums by developing electrostatic latent images on said photosensitive drums; and a plurality of transferring units, provided corresponding to said photosensitive drums, for transferring the toner images on said photosensitive drums onto the sheet.

2. The color image forming apparatus according to claim 1, further comprising endless feeding means for feeding a plurality of the sheets in series to said transferring units.

3. The color image forming apparatus according to claim 2, a deviation quantity of an eccentric phase between adjacent ones of said photosensitive drums is a value of an integral multiple of 2π/n (where n is the number of said photosensitive drums).

4. The color image forming apparatus according to claim 3, wherein the deviation quantity of an eccentric phase between said adjacent photosensitive drums is 180 degrees.

5. The color image forming apparatus according to claim 4, wherein a peripheral length of each of said photosensitive drums is twice a distance between said transferring units.

6. The color image forming apparatus according to claim 3, wherein the deviation quantity of an eccentric phase between said adjacent photosensitive drums is 90 degrees.

7. The color image forming apparatus according to claim 6, wherein a peripheral length of each of said photosensitive drums is four times greater than a distance between said transferring units.

8. The color image forming apparatus according to claim 2, wherein said endless feeding means is constructed of belt-based feeding means.

9. The color image forming apparatus according to claim 8, wherein said belt is composed of an electrostatic adsorption belt for adsorbing static electricity from the sheet.

10. The color image forming apparatus according to claim 8, wherein a deviation quantity of an eccentric phase between adjacent ones of said photosensitive drums is a value of an integral multiple of 2π/n (wherein n is the number of said photosensitive drums).

11. The color image forming apparatus according to claim 10, wherein the deviation quantity of an eccentric phase between said adjacent photosensitive drums is 180 degrees.

12. The color image forming apparatus according to claim 11, wherein a peripheral length of each of said photosensitive drums is twice a distance between said transferring units.

13. The color image forming apparatus according to claim 10, wherein the deviation quantity of an eccentric phase between said adjacent photosensitive drums is 90 degrees.

14. The color image forming apparatus according to claim 13, wherein a peripheral length of each of said photosensitive drums is four times greater than a distance between said transferring units.

15. The color image forming apparatus according to claim 1, wherein each of said photosensitive drums includes a drum base formed with a photosensitive layer along its periphery and a pair of flanges fitted into two side-portions of said drum base.

16. The color image forming apparatus according to claim 15, further comprising endless feeding means for feeding a plurality of the sheets in series to said transferring units.

17. The color image forming apparatus according to claim 16, a deviation quantity of an eccentric phase between adjacent ones of said photosensitive drums is a value of an integral multiple of 2π/n (where n is the number of said photosensitive drums).

18. The color image forming apparatus according to claim 17, wherein the deviation quantity of an eccentric phase between said adjacent photosensitive drums is 90 degrees.

19. The color image forming apparatus according to claim 17, wherein the deviation quantity of an eccentric phase between said photosensitive drums is 180 degrees.

20. The color image forming apparatus according to claim 19, wherein a peripheral length of each of said photosensitive drums is twice a distance between said transferring units.

21. The color image forming apparatus according to claim 19, wherein a peripheral length of each of said photosensitive drums is four times greater than a distance between said transferring units.

22. The color image forming apparatus according to claim 1, wherein said exposing source comprises a plurality of image exposing means provided for each of said photosensitive drums.

23. The color image forming apparatus according to claim 22, further comprising endless feeding means for feeding a plurality of the sheets in series to said transferring units.

24. The color image forming apparatus according to claim 23, a deviation quantity of an eccentric phase between adjacent one of said photosensitive drums is a value of an integral multiple of 2π/n (where n is the number of said photosensitive drums).

25. The color image forming apparatus according to claim 24, wherein the deviation quantity of an eccentric phase between adjacent photosensitive drums is 180 degrees.

26. The color image forming apparatus according to claim 25, wherein a peripheral length of each of said photosensitive drums is twice a distance between said transferring units.

27. The color image forming apparatus according to claim 24, wherein the deviation quantity of an eccentric phase between adjacent photosensitive drums is 90 degrees.

28. The color image forming apparatus according to claim 27, wherein a peripheral length of each of said photosensitive drums is four times greater than a distance between said transferring units.

\* \* \* \* \*